United States Patent
Kimura

(10) Patent No.: US 11,474,209 B2
(45) Date of Patent: Oct. 18, 2022

(54) DISTANCE MEASUREMENT USING HIGH DENSITY PROJECTION PATTERNS

(71) Applicant: Magik Eye Inc., New York, NY (US)

(72) Inventor: Akiteru Kimura, Hachioji (JP)

(73) Assignee: Magik Eye Inc., New York, NY (US)

( * ) Notice: Subject to any disclaimer, the term of this patent is extended or adjusted under 35 U.S.C. 154(b) by 346 days.

(21) Appl. No.: 16/819,504

(22) Filed: Mar. 16, 2020

(65) Prior Publication Data

US 2020/0309916 A1 Oct. 1, 2020

Related U.S. Application Data

(60) Provisional application No. 62/823,255, filed on Mar. 25, 2019.

(51) Int. Cl.
*G01S 7/481* (2006.01)
*G01S 17/89* (2020.01)
*G01S 17/08* (2006.01)

(52) U.S. Cl.
CPC ............ *G01S 7/4815* (2013.01); *G01S 17/08* (2013.01); *G01S 17/89* (2013.01)

(58) Field of Classification Search
None
See application file for complete search history.

(56) References Cited

U.S. PATENT DOCUMENTS

| | | |
|---|---|---|
| 4,914,460 A | 4/1990 | Caimi et al. |
| 5,061,062 A | 10/1991 | Schneiter |
| 5,699,444 A | 12/1997 | Palm |
| 5,730,702 A | 3/1998 | Tanaka et al. |
| 5,870,136 A | 2/1999 | Fuchs et al. |
| 5,980,454 A | 11/1999 | Broome |
| 6,038,415 A | 3/2000 | Nishi et al. |

(Continued)

FOREIGN PATENT DOCUMENTS

| | | |
|---|---|---|
| CN | 101794065 A | 8/2010 |
| CN | 102193295 A | 9/2011 |

(Continued)

OTHER PUBLICATIONS

International Search Report and Written Opinion mailed in corresponding PCT/US2020/022912 dated Jul. 10, 2020, 12 pages.

*Primary Examiner* — Stuart D Bennett
(74) *Attorney, Agent, or Firm* — Tong, Rea, Bentley & Kim, LLC

(57) ABSTRACT

An example method includes causing a light projecting system of a distance sensor to project a pattern of light onto an object. The pattern of light includes a plurality projection artifacts arranged in a grid. Rows and columns of the grid are arranged in a staggered manner. Spacing between the rows and spacing between the columns is set so that a pattern density parameter of the pattern of light increases with a length of a trajectory of the projection artifacts. The pattern density parameter is defined as a ratio between a maximum diameter of the projection artifacts and the length of the trajectory. The method further includes causing a light receiving system of the distance sensor to acquire an image of the pattern of light projected onto the object, and computing a distance from the object to the distance sensor based on locations of the projection artifacts in the image.

20 Claims, 8 Drawing Sheets

(56) References Cited

U.S. PATENT DOCUMENTS

| | | | |
|---|---|---|---|
| 6,122,039 | A | 9/2000 | Schumacher |
| 6,442,476 | B1 | 8/2002 | Poropat |
| 6,668,082 | B1 | 12/2003 | Davison et al. |
| 6,937,350 | B2 | 8/2005 | Shirley |
| 7,191,056 | B2 | 3/2007 | Costello et al. |
| 7,193,645 | B1 | 3/2007 | Aagaard et al. |
| 7,375,803 | B1 | 5/2008 | Bamji |
| 7,589,825 | B2 | 9/2009 | Orchard et al. |
| 9,098,909 | B2 | 8/2015 | Nomura |
| 9,488,757 | B2 | 11/2016 | Mukawa |
| 9,536,339 | B1 | 1/2017 | Worley et al. |
| 9,686,539 | B1 | 6/2017 | Zuliani et al. |
| 9,888,225 | B2 | 2/2018 | Znamensky et al. |
| 9,986,208 | B2 | 5/2018 | Chao et al. |
| 10,223,793 | B1 | 3/2019 | Ebrahimi et al. |
| 2003/0071891 | A1 | 4/2003 | Geng |
| 2004/0167744 | A1 | 8/2004 | Lin et al. |
| 2005/0288956 | A1 | 12/2005 | Speicher |
| 2006/0044546 | A1 | 3/2006 | Lewin et al. |
| 2006/0055942 | A1 | 3/2006 | Krattiger |
| 2006/0290781 | A1 | 12/2006 | Hama |
| 2007/0091174 | A1 | 4/2007 | Kochi et al. |
| 2007/0165243 | A1 | 7/2007 | Kang et al. |
| 2007/0206099 | A1 | 9/2007 | Matsuo |
| 2008/0259354 | A1 | 10/2008 | Gharib |
| 2010/0007719 | A1 | 1/2010 | Frey et al. |
| 2010/0149315 | A1 | 6/2010 | Qu et al. |
| 2010/0209002 | A1 | 8/2010 | Thiel et al. |
| 2010/0223706 | A1 | 9/2010 | Becker et al. |
| 2010/0238416 | A1 | 9/2010 | Kuwata |
| 2010/0303341 | A1 | 12/2010 | Hausler |
| 2011/0037849 | A1 | 2/2011 | Niclass et al. |
| 2011/0188054 | A1 | 8/2011 | Petronius et al. |
| 2012/0050528 | A1* | 3/2012 | Davies ............... G01C 11/02 |
| | | | 348/136 |
| 2012/0051588 | A1 | 3/2012 | Mceldowney |
| 2012/0056982 | A1 | 3/2012 | Katz et al. |
| 2012/0062758 | A1 | 3/2012 | Devine et al. |
| 2012/0076375 | A1 | 3/2012 | Saijo et al. |
| 2012/0105867 | A1 | 5/2012 | Komatsu |
| 2012/0113252 | A1 | 5/2012 | Yang et al. |
| 2012/0219699 | A1 | 8/2012 | Pettersson |
| 2012/0225718 | A1 | 9/2012 | Zhang |
| 2012/0236288 | A1 | 9/2012 | Stanley |
| 2012/0236317 | A1 | 9/2012 | Nomura |
| 2012/0307260 | A1 | 12/2012 | Keshavmurthy |
| 2013/0038882 | A1 | 2/2013 | Umeda et al. |
| 2013/0050710 | A1* | 2/2013 | Yamaguchi ............ G06F 3/011 |
| | | | 356/610 |
| 2013/0076865 | A1 | 3/2013 | Tateno et al. |
| 2013/0088575 | A1 | 4/2013 | Park et al. |
| 2013/0155417 | A1 | 6/2013 | Ohsawa |
| 2013/0201325 | A1* | 8/2013 | Kessler ............... A61M 13/00 |
| | | | 348/135 |
| 2013/0242090 | A1 | 9/2013 | Yoshikawa |
| 2013/0307933 | A1 | 11/2013 | Znamensky et al. |
| 2013/0314688 | A1 | 11/2013 | Likholyot |
| 2014/0000520 | A1 | 1/2014 | Bareket |
| 2014/0009571 | A1 | 1/2014 | Geng |
| 2014/0016113 | A1 | 1/2014 | Holt et al. |
| 2014/0036096 | A1 | 2/2014 | Sterngren |
| 2014/0071239 | A1 | 3/2014 | Yokota |
| 2014/0085429 | A1 | 3/2014 | Hébert et al. |
| 2014/0125813 | A1 | 5/2014 | Holz |
| 2014/0207326 | A1 | 7/2014 | Murphy |
| 2014/0241614 | A1 | 8/2014 | Lee |
| 2014/0275986 | A1 | 9/2014 | Vertikov |
| 2014/0320605 | A1 | 10/2014 | Johnson |
| 2015/0009301 | A1 | 1/2015 | Ribnick et al. |
| 2015/0012244 | A1 | 1/2015 | Oki |
| 2015/0029321 | A1* | 1/2015 | Imamura ............ H04N 5/23218 |
| | | | 348/136 |
| 2015/0062558 | A1 | 3/2015 | Koppal et al. |
| 2015/0077764 | A1 | 3/2015 | Braker et al. |
| 2015/0116460 | A1* | 4/2015 | Jouet ................... G06T 15/50 |
| | | | 348/46 |
| 2015/0131054 | A1 | 5/2015 | Wuellner et al. |
| 2015/0016003 | A1 | 6/2015 | Terry et al. |
| 2015/0171236 | A1 | 6/2015 | Murray |
| 2015/0248796 | A1 | 9/2015 | Iyer et al. |
| 2015/0268399 | A1 | 9/2015 | Futterer |
| 2015/0288956 | A1 | 10/2015 | Mallet et al. |
| 2015/0323321 | A1 | 11/2015 | Oumi |
| 2015/0336013 | A1 | 11/2015 | Stenzier et al. |
| 2015/0347833 | A1 | 12/2015 | Robinson |
| 2015/0381907 | A1 | 12/2015 | Boetliger et al. |
| 2016/0022374 | A1 | 1/2016 | Haider |
| 2016/0033262 | A1* | 2/2016 | Kessler ................. G06T 7/521 |
| | | | 348/135 |
| 2016/0041266 | A1 | 2/2016 | Smits |
| 2016/0050401 | A1 | 2/2016 | Gordon |
| 2016/0117561 | A1 | 4/2016 | Miyazawa et al. |
| 2016/0128553 | A1 | 5/2016 | Geng |
| 2016/0157725 | A1 | 6/2016 | Munoz |
| 2016/0178915 | A1 | 6/2016 | Mor et al. |
| 2016/0249810 | A1 | 9/2016 | Darty et al. |
| 2016/0261854 | A1 | 9/2016 | Ryu et al. |
| 2016/0267682 | A1 | 9/2016 | Yamashita |
| 2016/0288330 | A1 | 10/2016 | Konolige |
| 2016/0327385 | A1 | 11/2016 | Kimura |
| 2016/0328854 | A1 | 11/2016 | Kimura |
| 2016/0334939 | A1 | 11/2016 | Dawson et al. |
| 2016/0350594 | A1 | 12/2016 | McDonald |
| 2016/0377414 | A1 | 12/2016 | Thuries et al. |
| 2016/0379368 | A1 | 12/2016 | Sakas et al. |
| 2017/0067734 | A1 | 3/2017 | Heidemann |
| 2017/0098305 | A1 | 4/2017 | Gossow |
| 2017/0102461 | A1 | 4/2017 | Tezuka et al. |
| 2017/0135617 | A1 | 5/2017 | Alasirniöet al. |
| 2017/0221226 | A1 | 8/2017 | Shen et al. |
| 2017/0270689 | A1 | 9/2017 | Messely et al. |
| 2017/0284799 | A1 | 10/2017 | Wexler et al. |
| 2017/0307544 | A1 | 10/2017 | Nagata |
| 2017/0347086 | A1 | 11/2017 | Watanabe |
| 2018/0010903 | A1 | 1/2018 | Takao et al. |
| 2018/0011194 | A1 | 1/2018 | Masuda et al. |
| 2018/0073863 | A1 | 3/2018 | Watanabe |
| 2018/0080761 | A1 | 3/2018 | Takao et al. |
| 2018/0143018 | A1 | 5/2018 | Kimura |
| 2018/0156609 | A1 | 6/2018 | Kimura |
| 2018/0227566 | A1 | 8/2018 | Price et al. |
| 2018/0247424 | A1 | 8/2018 | Bleyer |
| 2018/0249142 | A1 | 8/2018 | Hicks et al. |
| 2018/0324405 | A1 | 11/2018 | Thirion |
| 2018/0329038 | A1 | 11/2018 | Lin et al. |
| 2018/0357871 | A1 | 12/2018 | Siminoff |
| 2019/0064359 | A1 | 2/2019 | Yang |
| 2019/0107387 | A1 | 4/2019 | Kimura |
| 2019/0108743 | A1 | 4/2019 | Kimura |
| 2019/0122057 | A1 | 4/2019 | Kimura |
| 2019/0295270 | A1 | 9/2019 | Kimura |
| 2019/0297241 | A1 | 9/2019 | Kimura |
| 2019/0297278 | A1 | 9/2019 | Sumi et al. |
| 2019/0377088 | A1 | 12/2019 | Kimura |
| 2020/0003556 | A1 | 1/2020 | Kimura |
| 2020/0051268 | A1 | 2/2020 | Kimura |
| 2020/0077010 | A1 | 3/2020 | Noguchi |
| 2020/0090355 | A1 | 3/2020 | Hall |
| 2020/0092524 | A1 | 3/2020 | Morris |
| 2020/0182974 | A1 | 6/2020 | Kimura |
| 2020/0236315 | A1 | 7/2020 | Kimura |
| 2020/0278197 | A1 | 9/2020 | Tokimitsu |
| 2020/0319309 | A1* | 10/2020 | Van Nieuwenhove ..................... |
| | | | G01S 7/4814 |

FOREIGN PATENT DOCUMENTS

| | | |
|---|---|---|
| CN | 103428026 A | 4/2013 |
| CN | 103196385 A | 7/2013 |
| CN | 103559735 A | 2/2014 |
| CN | 104160243 A | 11/2014 |
| CN | 104515514 A | 4/2015 |
| CN | 104685868 A | 6/2015 |

(56) References Cited

FOREIGN PATENT DOCUMENTS

| | | | |
|---|---|---|---|
| CN | 106067968 A | 11/2016 |
| CN | 106338244 A | 1/2017 |
| CN | 106796179 A | 5/2017 |
| DE | 102016118562 A1 | 3/2017 |
| EP | 0358628 A2 | 3/1990 |
| EP | 1 739 391 A2 | 1/2007 |
| EP | 3 171 129 A1 | 5/2017 |
| JP | H045112 A | 2/1992 |
| JP | H0961126 A | 3/1997 |
| JP | 2002-056348 A | 2/2002 |
| JP | 4485365 B2 | 2/2006 |
| JP | 2006-313116 A | 11/2006 |
| JP | 2007-10346 A | 1/2007 |
| JP | 2007-187581 A | 7/2007 |
| JP | 2007-315864 A | 12/2007 |
| JP | 2010-091855 A | 4/2010 |
| JP | 2010-101683 A | 5/2010 |
| JP | 2010-256182 A | 11/2010 |
| JP | 2011-515703 A | 5/2011 |
| JP | 2012-047500 A | 3/2012 |
| JP | 2013-8513179 A | 4/2013 |
| JP | 2014-020978 A | 2/2014 |
| JP | 2014-044113 A | 3/2014 |
| JP | 2014-511590 A | 5/2014 |
| JP | 2014-122789 A | 7/2014 |
| JP | 2014-238259 A | 12/2014 |
| JP | 2016-6166747 A | 9/2016 |
| JP | 6038415 B1 | 12/2016 |
| JP | 6241793 B2 | 12/2017 |
| JP | 2018514783 A | 6/2018 |
| JP | 2019-203822 A | 11/2019 |
| KR | 10-2013-0000356 A | 1/2013 |
| KR | 10-2013-0037152 A | 4/2013 |
| KR | 10-2015-0101749 A | 9/2015 |
| KR | 10-2016-0020323 | 2/2016 |
| KR | 10-2017-0005649 A | 1/2017 |
| KR | 10-2017-0054221 A | 5/2017 |
| KR | 10-2017-0094968 | 8/2017 |
| TW | I320480 B | 2/2010 |
| TW | I451129 B | 4/2012 |
| WO | WO 2012/081506 A1 | 6/2012 |
| WO | WO2013/046927 A1 | 4/2013 |
| WO | WO 2013/145164 | 10/2013 |
| WO | WO 2014/106843 A2 | 7/2014 |
| WO | WO 2014/131064 | 8/2014 |
| WO | WO 2015/166915 A1 | 11/2015 |
| WO | WO 2016/154218 | 9/2016 |
| WO | WO 2017/053368 A1 | 3/2017 |

\* cited by examiner

DISTANCE MEASUREMENT USING HIGH DENSITY PROJECTION PATTERNS

CROSS REFERENCE TO RELATED APPLICATIONS

This application claims the priority of U.S. Provisional Patent Application Ser. No. 62/823,255, filed Mar. 25, 2019, which is herein incorporated by reference in its entirety.

BACKGROUND

U.S. patent application Ser. Nos. 14/920,246, 15/149,323, and 15/149,429 describe various configurations of distance sensors. Such distance sensors may be useful in a variety of applications, including security, gaming, control of unmanned vehicles, and other applications.

The distance sensors described in these applications include projection systems (e.g., comprising lasers, diffractive optical elements, and/or other cooperating components) which project beams of light in a wavelength that is substantially invisible to the human eye (e.g., infrared) into a field of view. The beams of light spread out to create a pattern (of dots, dashes, or other artifacts) that can be detected by an appropriate light receiving system (e.g., lens, image capturing device, and/or other components). When the pattern is incident upon an object in the field of view, the distance from the sensor to the object can be calculated based on the appearance of the pattern (e.g., the positional relationships of the dots, dashes, or other artifacts) in one or more images of the field of view, which may be captured by the sensor's light receiving system. The shape and dimensions of the object can also be determined.

For instance, the appearance of the pattern may change with the distance to the object. As an example, if the pattern comprises a pattern of dots, the dots may appear closer to each other when the object is closer to the sensor, and may appear further away from each other when the object is further away from the sensor.

SUMMARY

In one example, a method includes causing, by a processing system of a distance sensor, a light projecting system of the distance sensor to project a pattern of light onto an object, wherein the pattern of light comprises a plurality projection artifacts, wherein the plurality of projection artifacts is arranged in a grid comprising a plurality of rows, wherein an arrangement of the plurality of rows is staggered, and a plurality of columns, wherein an arrangement of the plurality of columns is staggered, wherein a spacing between the plurality of rows and a spacing between the plurality of columns is set so that a pattern density parameter of the pattern of light increases with a length of a trajectory of the plurality of projection artifacts, wherein the pattern density parameter is defined as a ratio between a maximum diameter of the plurality of projection artifacts and the length of the trajectory, causing, by the processing system, a light receiving system of the distance sensor to acquire an image of the pattern of light projected onto the object, and computing, by the processing system, a distance from the object to the distance sensor based on locations of the plurality of projection artifacts in the image.

In another example, a non-transitory machine-readable storage medium is encoded with instructions executable by a processing system of a distance sensor. When executed, the instructions cause the processing system to perform operations including causing a light projecting system of the distance sensor to project a pattern of light onto an object, wherein the pattern of light comprises a plurality projection artifacts, wherein the plurality of projection artifacts is arranged in a grid comprising a plurality of rows, wherein an arrangement of the plurality of rows is staggered, and a plurality of columns, wherein an arrangement of the plurality of columns is staggered, wherein a spacing between the plurality of rows and a spacing between the plurality of columns is set so that a pattern density parameter of the pattern of light increases with a length of a trajectory of the plurality of projection artifacts, wherein the pattern density parameter is defined as a ratio between a maximum diameter of the plurality of projection artifacts and the length of the trajectory a light receiving system of the distance sensor to acquire an image of the pattern of light projected onto the object, and computing a distance from the object to the distance sensor based on locations of the plurality of projection artifacts in the image.

In another example, an apparatus includes a processing system and a non-transitory machine-readable storage medium encoded with instructions executable by the processing system. When executed, the instructions cause the processing system to perform operations including causing a light projecting system of a distance sensor to project a pattern of light onto an object, wherein the pattern of light comprises a plurality projection artifacts, wherein the plurality of projection artifacts is arranged in a grid comprising a plurality of rows, wherein an arrangement of the plurality of rows is staggered, and a plurality of columns, wherein an arrangement of the plurality of columns is staggered, wherein a spacing between the plurality of rows and a spacing between the plurality of columns is set so that a pattern density parameter of the pattern of light increases with a length of a trajectory of the plurality of projection artifacts, wherein the pattern density parameter is defined as a ratio between a maximum diameter of the plurality of projection artifacts and the length of the trajectory a light receiving system of the distance sensor to acquire an image of the pattern of light projected onto the object, and computing a distance from the object to the distance sensor based on locations of the plurality of projection artifacts in the image.

DETAILED DESCRIPTION

Figure 1:
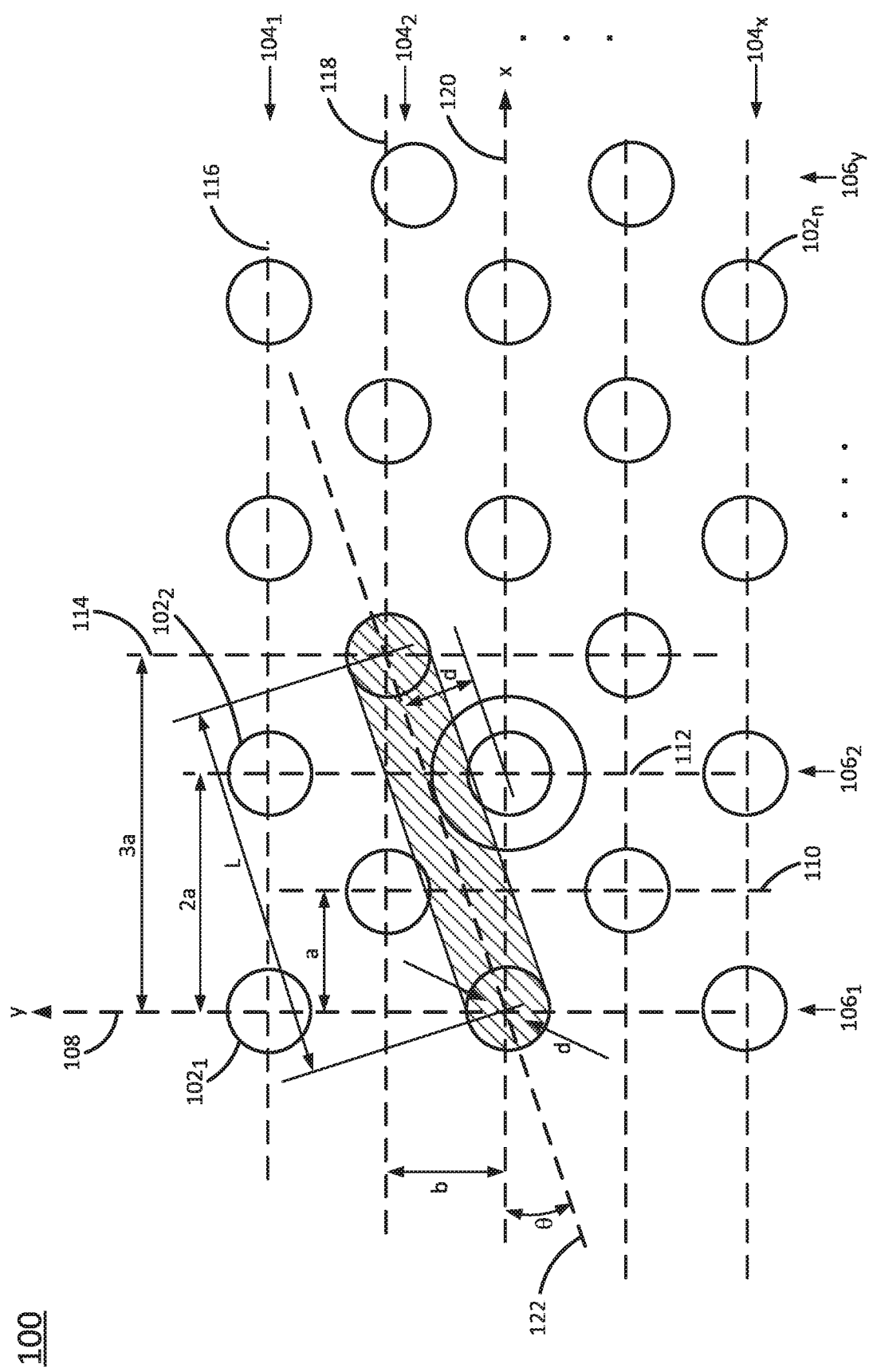
FIG. 1 illustrates a portion of one example of a projection pattern, according to the present disclosure.

The present disclosure broadly describes an apparatus, method, and non-transitory computer-readable medium for distance measurement using high density projection patterns. As discussed above, distance sensors such as those described in U.S. patent application Ser. Nos. 14/920,246, 15/149,323, and 15/149,429 determine the distance to an object (and, potentially, the shape and dimensions of the object) by projecting beams of light that spread out to create a pattern (e.g., of dots, dashes, or other artifacts) in a field of view that includes the object. The beams of light may be projected from one or more laser light sources which emit light of a wavelength that is substantially invisible to the human eye, but which is visible to an appropriate detector (e.g., of the light receiving system). The three-dimensional distance to the object may then be calculated based on the appearance of the pattern to the detector, using triangulation techniques.

High-density patterns (i.e., patterns in which the distance between projection artifacts is small) are often desirable as they allow for higher resolution distance measurements to be made. However, the high density of such patterns can also make the distance calculation more complicated. For one, the closer the projection artifacts are to each other, the more likely it is that the movement of the trajectories (moving areas, or ranges of potential movement) of the individual projection artifacts will overlap. This overlap makes it more difficult for the sensor to distinguish the individual projection artifacts and their movements. Since the movement of a projection artifact affects the projection artifact's appearance, and since the distance is calculated based on the appearances of the projection artifacts, this complicates the distance measurement and leads to longer calculation times.

In addition, even a lower density pattern may appear to be denser when the object is closer to the sensor. Specifically, the size, intensity, and spacing of the projection artifacts change with the distance to the object. When the sensor is further away from the object, the projection pattern will appear less dense; the projection artifacts will appear smaller and less bright, with greater spacing between them. When the sensor is closer to the object, the projection pattern will appear denser; the projection artifacts will appear larger and brighter, with less spacing between them. The sizes, intensities, and shapes of the projection artifacts may also change based on the shape, reflectance, and reflectance distribution of the object.

Examples of the present disclosure provide a high-density projection pattern in which the projection artifacts are arranged in a grid pattern that comprise a plurality of rows and a plurality of columns. The plurality of rows and the plurality of columns may be arranged in a staggered manner. The density of the projection pattern may be defined by a pattern density parameter, which may be computed as the ratio between the maximum diameter (or width) of the individual projection artifacts to the length of the projection artifacts' trajectories. In particular, the pattern density increases with a decrease in the pattern density parameter. In further examples, an interval pass alignment of the projection pattern may be adjusted based on the value of the pattern density parameter, such that the interval pass alignment is greater for higher values of the pattern density parameter.

FIG. 1 illustrates a portion of one example of a projection pattern 100, according to the present disclosure. As illustrated, the projection pattern 100 comprises a plurality of projection artifacts $102_1$-$102_n$ (hereinafter individually referred to as a "projection artifact 102" or collectively referred to as "projection artifacts 102"). The projection artifacts 102 comprise shapes that are created on a surface when respective beams of light, projected from the light projecting system of a distance sensor, are incident upon the surface. The projection artifacts 102 may comprise dots, dashes, x's, or any other shape depending upon the configuration of the beams of light. In the example illustrated in FIG. 1, the projection artifacts 102 comprise dots.

As further illustrated in FIG. 1, the plurality of projection artifacts 102 is arranged into a grid pattern comprising a plurality of rows $104_1$-$104_x$ (hereinafter individually referred to as a "row 104" or collectively referred to as "rows 104") and a plurality of columns $106_1$-$106_y$ (hereinafter individually referred to as "a column 106" or collectively referred to as "columns 106"). In one example, the arrangement of the rows 104 is staggered. For instance, in the example illustrated, the rows 104 are arranged so that a subset of the projection artifacts, namely, the projection artifacts 102 of every other row 104, are aligned or collinear along imaginary lines that pass through the centers of the projection artifacts 102 in the y or vertical direction. As an example, the projection artifacts 102 of the rows $104_1$ and $104_x$ are aligned in this manner. Conversely, in the example illustrated, another subset of the projection artifacts, namely, the projection artifacts 102 of any two immediately adjacent rows 104, will not be aligned (e.g., there will not be an imaginary line in the y or vertical direction that passes through the centers of the projection artifacts 102 of both rows 104). As an example, the projection artifacts 102 of the rows $104_1$ and $104_2$ are arranged in this manner.

Similarly, the arrangement of the columns 106 is also staggered. For instance, in the example illustrated, the columns 106 are arranged so that the projection artifacts 102 of every other column 106 are aligned or collinear along imaginary lines that pass through the centers of the projection artifacts 102 in the x or horizontal direction. As an example, the projection artifacts 102 of the columns $106_1$ and $106_y$ are aligned in this manner. Conversely, in the example illustrated, the projection artifacts 102 of any two immediately adjacent columns 106 will not be aligned (e.g., there will not be an imaginary line in the x or horizontal direction that passes through the centers of the projection artifacts 102 of both columns 106). As an example, the projection artifacts 102 of the columns $106_1$ and $106_2$ are arranged in this manner.

Furthermore, the example projection pattern 100 of FIG. 1 is arranged so that a "pass alignment" of the projection pattern 100 is three intervals in the horizontal or x direction, where an "interval" in the horizontal or x direction is understood within the context of the present disclosure to refer to the distance in the x or horizontal direction between a first imaginary line 108 that passes (in the y or vertical direction) through the centers of the projection artifacts 102 in a first column 106 (e.g., column $106_1$) and a second imaginary line 110 that passes (in the y or vertical direction) through the centers of the projection artifacts 102 in a second column 106 that is immediately adjacent to the first column 106 (e.g., column $106_2$).

The length of a single interval in the horizontal or x direction may be defined as "a." That is, a distance of a may exist in the horizontal or x direction between each pair of immediately adjacent columns 106 (or between the centers of the projection artifacts 102 in the pair of immediately adjacent columns 106).

Similarly, the distance in the x or horizontal direction from the first imaginary line 108 that passes (in the y or vertical direction) through the centers of the projection artifacts 102 in the first column 106 to a third imaginary line 112 that passes (in the y or vertical direction) through the centers of the projection artifacts 102 in a third column 106 that is two columns away from the first column 106 may be defined as "2a." The distance in the x or horizontal direction from the first imaginary line 108 that passes (in the y or vertical direction) through the centers of the projection artifacts 102 in the first column 106 to a fourth imaginary line 114 that passes (in the y or vertical direction) through the centers of the projection artifacts 102 in a fourth column 106 that is three columns away from the first column 106 may be defined as "3a."

Furthermore, the example projection pattern 100 of FIG. 1 is arranged so that an "interval" in the vertical or y direction is understood within the context of the present disclosure to refer to the distance in the y or vertical direction between a first imaginary line 116 that passes (in the x or horizontal direction) through the centers of the projection artifacts 102 in a first row 104 (e.g., row $104_1$) and a second imaginary line 118 that passes (in the x or horizontal direction) through the centers of the projection artifacts 102 in a second row 104 that is immediately adjacent to the first row 104 (e.g., row $104_2$). A single interval in the vertical or y direction may be defined as "b." That is, a distance of b may exist in the vertical or y direction between each pair of immediately adjacent rows 104 (or between the centers of the projection artifacts 102 in the pair of immediately adjacent rows 104).

As discussed above, the example projection pattern 100 of FIG. 1 is arranged so that a "pass alignment" of the projection pattern 100 is three intervals in the horizontal or x direction. In this case, the length, L, of the projection artifacts' trajectory (or moving range) may be approximately equal to the shortest distance between the center of a first projection artifact 102 in a first column 106 and the center of a second projection artifact 102 in the fourth column 106 that is three columns away from the first column 106. Thus, in FIG. 1, L is approximately (though not exactly) equal to 3a.

Furthermore, an angle θ in the projection pattern 100 may be defined as the angle between an imaginary line 120 that passes in the x or horizontal direction between the center of a first projection point 102 in a first column 106 and an imaginary line 122 that passes through both the center of the first projection point 102 and a second projection point 102 in a second column 106 that is three columns away from the first column (where the second projection point 102 may be the closest projection point in the second column 106 to the first projection point 102). The first projection point 102 and the second projection point 102 may also reside in immediately adjacent rows 104.

With this understanding, the angle θ may be defined as follows:

$$\theta = \sin^{-1}(d/a) \approx d/a \quad \text{(EQN. 1)}$$

where d is the maximum diameter of the projection artifacts 102 on an image sensor of a distance sensor's light receiving system (hereinafter, d is simply referred to as the diameter of the projection artifacts for ease of explanation). Furthermore, $$\sin(\theta) \approx \tan(\theta) \quad \text{(EQN. 2)}$$

and $$b = \tan(\theta) \times 3a \approx 3d. \quad \text{(EQN. 3)}$$

Therefore, $$\frac{b}{a} = 3 \times (d/a) \quad \text{(EQN. 4)}$$

Finally, a pattern density parameter k can be derived, where k is the ratio between the maximum diameter, d, of a projection artifact 102, and the length, L, of the projection pattern's trajectory or moving distance by changing object distance (e.g., minimum to maximum distance). Thus, k may be defined as:

$$k = \frac{L}{a} = 3 \times \frac{a}{d} \quad \text{(EQN. 5)}$$

when a=b (or a/b=1). However, it should be noted that, as illustrated in some of the examples described in further detail below, a may not be equal to b in some patterns. The larger the value of the pattern density parameter, k, is, the greater the spacing there will be between individual projection artifacts in a projection pattern. Thus, the density of a projection pattern is inversely proportional to the magnitude of the value of the pattern density parameter. From the definition of k in EQN. 5, and the assumption that a=b, $$3 \times \left(\frac{d}{a}\right) = 1 \quad \text{(EQN. 6)}$$

and $$k = 3 \times \frac{a}{d} = 9 \quad \text{(EQN. 7)}$$

In one example, the three-interval pass alignment arrangement of the distance pattern 100 illustrated in FIG. 1 may be implemented when k is less than a first predefined threshold. In one example, the first predefined threshold is fifteen, such that k<15.

Figure 2:
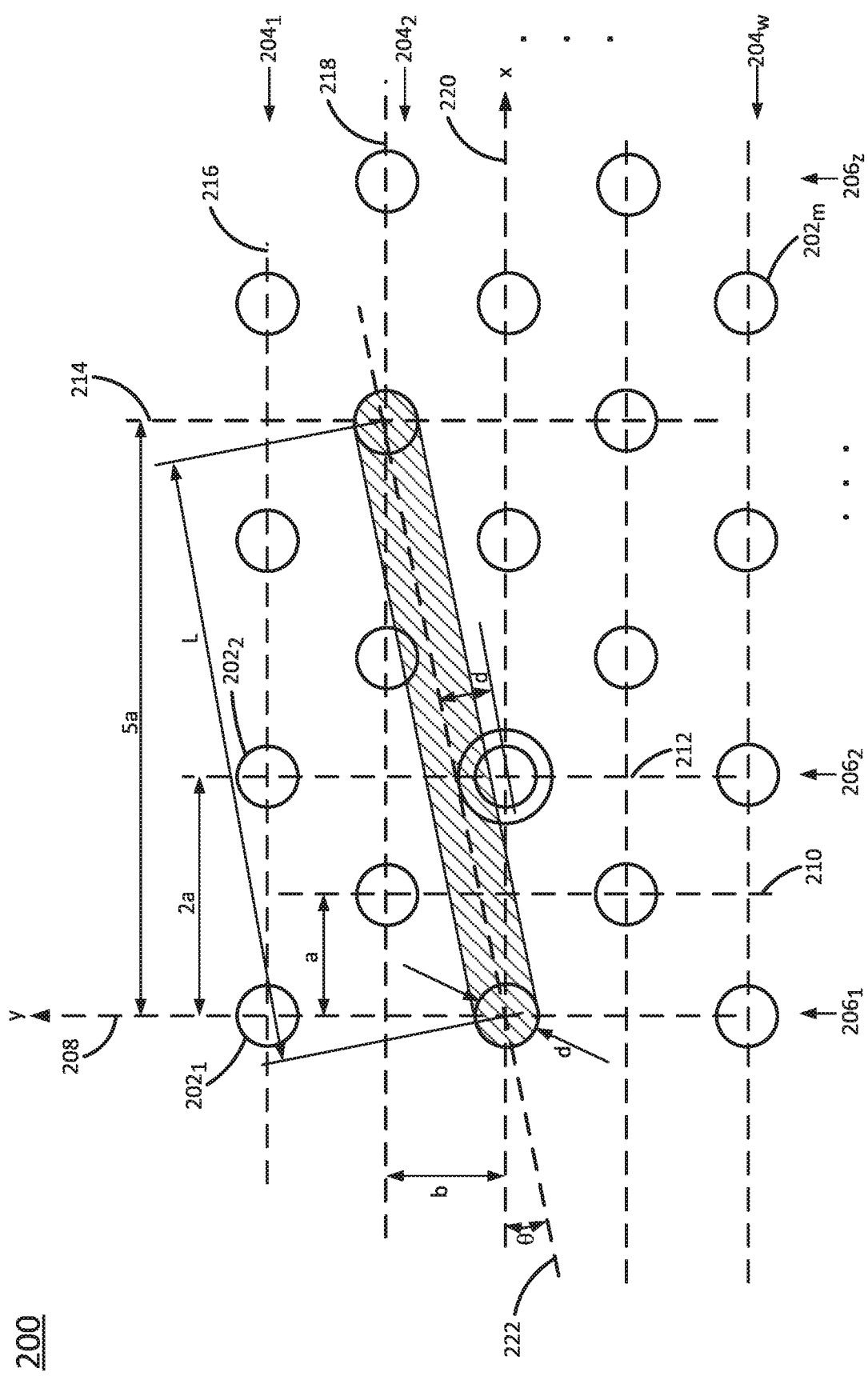
FIG. 2 illustrates a portion of another example of a projection pattern, according to the present disclosure.

FIG. 2 illustrates a portion of another example of a projection pattern 200, according to the present disclosure. As illustrated, the projection pattern 200 comprises a plurality of projection artifacts $202_1$-$202_m$ (hereinafter individually referred to as a "projection artifact 202" or collectively referred to as "projection artifacts 202"). The projection artifacts 202 comprise shapes that are created on a surface when respective beams of light, projected from the light projecting system of a distance sensor, are incident upon the surface. The projection artifacts 202 may comprise dots, dashes, x's, or any other shape depending upon the configuration of the beams of light. In the example illustrated in FIG. 2, the projection artifacts 202 comprise dots.

As further illustrated in FIG. 2, the plurality of projection artifacts 202 is arranged into a grid pattern comprising a plurality of rows $204_1$-$204_w$ (hereinafter individually referred to as a "row 204" or collectively referred to as "rows 204") and a plurality of columns $206_1$-$206_z$ (hereinafter individually referred to as "a column 206" or collectively referred to as "columns 206"). In one example, the arrangement of the rows 204 is staggered. For instance, in the example illustrated, the rows 204 are arranged so that the projection artifacts 202 of every other row 204 are aligned or collinear along imaginary lines that pass through the centers of the projection artifacts 202 in they or vertical direction. As an example, the projection artifacts 202 of the rows $204_1$ and $204_w$ are aligned in this manner. Conversely, in the example illustrated, the projection artifacts 202 of any two immediately adjacent rows 204 will not be aligned (e.g., there will not be an imaginary line in the y or vertical direction that passes through the centers of the projection artifacts 202 of both rows 204). As an example, the projection artifacts 202 of the rows $204_1$ and $204_2$ are arranged in this manner.

Similarly, the arrangement of the columns 206 is also staggered. For instance, in the example illustrated, the columns 206 are arranged so that the projection artifacts 202 of every other column 206 are aligned or collinear along imaginary lines that pass through the centers of the projection artifacts 202 in the x or horizontal direction. As an example, the projection artifacts 202 of the columns $206_1$ and $206_z$ are aligned in this manner. Conversely, in the example illustrated, the projection artifacts 202 of any two immediately adjacent columns 206 will not be aligned (e.g., there will not be an imaginary line in the x or horizontal direction that passes through the centers of the projection artifacts 202 of both columns 206). As an example, the projection artifacts 202 of the columns $206_1$ and $206_2$ are arranged in this manner.

Thus far, the example projection pattern 200 of FIG. 2 is similar to the example projection pattern 100 of FIG. 1. However, unlike the projection pattern 100, in which the pass alignment is arranged to be three intervals in the horizontal or x direction, the example projection pattern 200 is arranged so that the pass alignment of the projection pattern 200 is five intervals in the horizontal or x direction. As is the case in FIG. 1, an "interval" in the horizontal or x direction is understood within the context of the present disclosure to refer to the distance in the x or horizontal direction between a first imaginary line 208 that passes (in the y or vertical direction) through the centers of the projection artifacts 202 in a first column 206 (e.g., column $206_1$) and a second imaginary line 210 that passes (in the y or vertical direction) through the centers of the projection artifacts 202 in a second column 206 that is immediately adjacent to the first column 206 (e.g., column $206_2$).

The length of a single interval in the horizontal or x direction (a "first interval") may be defined as "a." That is, a distance of a may exist in the horizontal or x direction between each pair of immediately adjacent columns 206 (or between the centers of the projection artifacts 202 in the pair of immediately adjacent columns 206).

Similarly, the distance in the x or horizontal direction from the first imaginary line 208 that passes (in the y or vertical direction) through the centers of the projection artifacts 202 in the first column 206 to a third imaginary line 212 that passes (in the y or vertical direction) through the centers of the projection artifacts 202 in a third column 206 that is two columns away from the first column 206 may be defined as "2a." The distance in the x or horizontal direction from the first imaginary line 208 that passes (in the y or vertical direction) through the centers of the projection artifacts 202 in the first column 206 to a fourth imaginary line 214 that passes (in the y or vertical direction) through the centers of the projection artifacts 202 in a fourth column 206 that is five columns away from the first column 206 may be defined as "5a."

Furthermore, the example projection pattern 200 of FIG. 2 is arranged so that an "interval" in the vertical or y direction (a "second interval") is understood within the context of the present disclosure to refer to the distance in the y or vertical direction between a first imaginary line 216 that passes (in the x or horizontal direction) through the centers of the projection artifacts 202 in a first row 204 (e.g., row $204_1$) and a second imaginary line 218 that passes (in the x or horizontal direction) through the centers of the projection artifacts 202 in a second row 204 that is immediately adjacent to the first row 204 (e.g., row $204_2$). A single interval in the vertical or y direction may be defined as "b." That is, a distance of b may exist in the vertical or y direction between each pair of immediately adjacent rows 204 (or between the centers of the projection artifacts 202 in the pair of immediately adjacent rows 204).

As discussed above, the example projection pattern 200 of FIG. 2 is arranged so that a "pass alignment" of the projection pattern 200 is five intervals in the horizontal or x direction. In this case, the length, L, of the projection artifacts' trajectory (or moving range) may be approximately equal to the shortest distance between the center of a first projection artifact 202 in a first column 206 and the center of a second projection artifact 202 in the fourth column 206 that is five columns away from the first column 206. Thus, in FIG. 2, L is approximately (though not exactly) equal to 5a.

Furthermore, an angle $\theta$ in the projection pattern 200 may be defined as the angle between an imaginary line 220 that passes in the x or horizontal direction between the center of a first projection point 202 in a first column 206 and an imaginary line 222 that passes through both the center of the first projection point 202 and the center of a second projection point 202 in a second column 206 that is five columns away from the first column (where the second projection point 202 may be the closest projection point in the second column 206 to the first projection point 202). The first projection point 202 and the second projection point 202 may also reside in immediately adjacent rows 204. The angle $\theta$ may be defined according to EQN. 1, above. Moreover, the relation of EQN. 2 also holds for the example projection pattern 200 of FIG. 2.

However, for the five-interval pass alignment of FIG. 2, the interval b in the vertical or y direction may be defined according to:

$$b = \tan(\theta) \times 5a \approx 5d. \qquad \text{(EQN. 8)}$$

Therefore, $$\frac{b}{a} = 5 \times (d/a) \qquad \text{(EQN. 9)}$$

Thus, k may be defined as:

$$k = \frac{L}{a} = 5 \times \frac{a}{d} \qquad \text{(EQN. 10)}$$

when a=b (or a/b=1). As such, $$3 \times \left(\frac{d}{a}\right) = 1 \quad \text{(EQN. 11)}$$

and $$k = 5 \times \frac{a}{d} = 25. \quad \text{(EQN. 12)}$$

In one example, the five-interval pass alignment arrangement of the distance pattern 200 illustrated in FIG. 2 may be implemented when k is greater than the first predefined threshold, but less than a second predefined threshold. In one example, the first predefined threshold is fifteen, while the second predefined threshold is thirty-five, such that 15<k<35.

Figure 3:
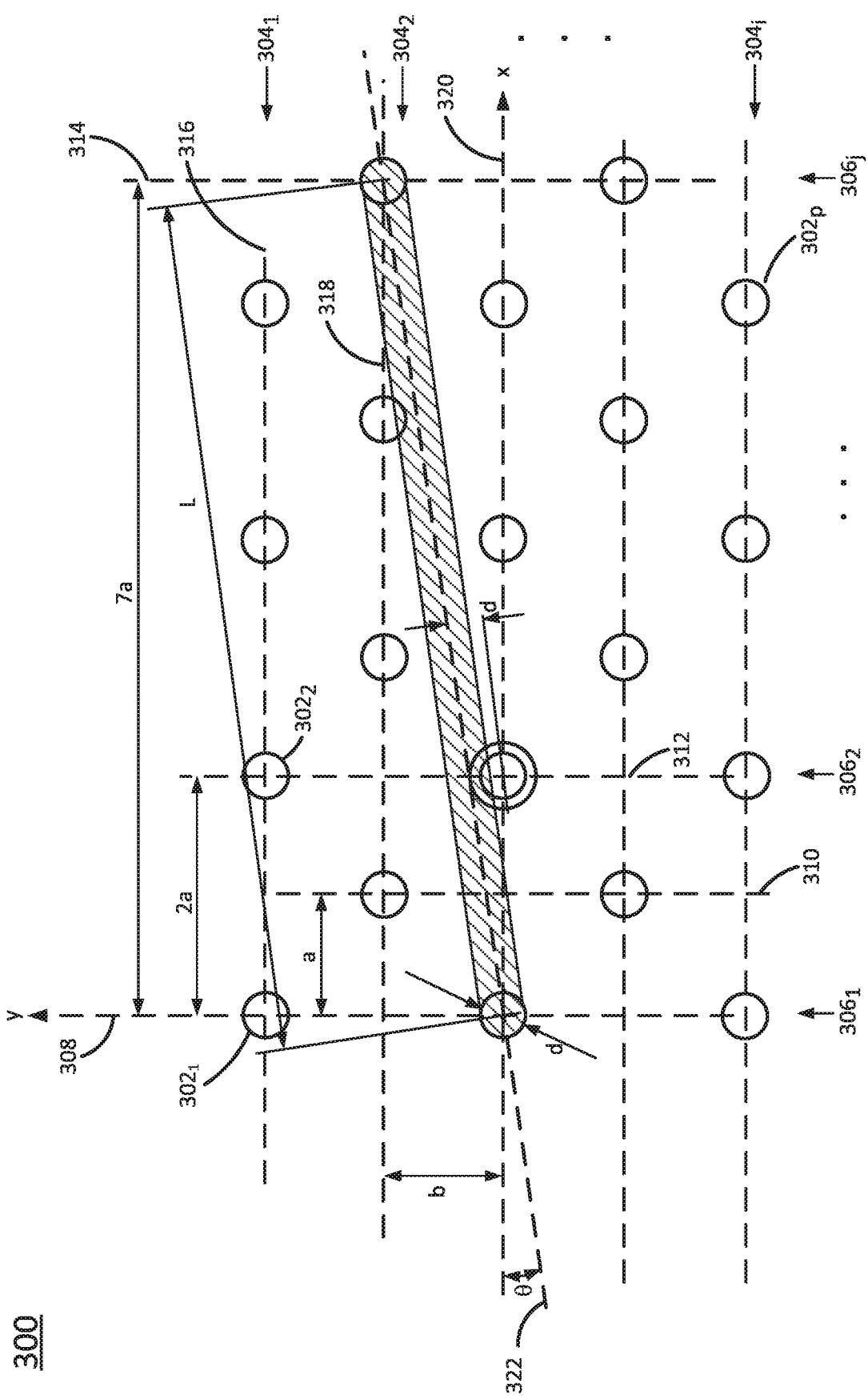
FIG. 3 illustrates a portion of another example of a projection pattern, according to the present disclosure.

FIG. 3 illustrates a portion of another example of a projection pattern 300, according to the present disclosure. As illustrated, the projection pattern 300 comprises a plurality of projection artifacts $302_1$-$302_p$ (hereinafter individually referred to as a "projection artifact 302" or collectively referred to as "projection artifacts 302"). The projection artifacts 302 comprise shapes that are created on a surface when respective beams of light, projected from the light projecting system of a distance sensor, are incident upon the surface. The projection artifacts 302 may comprise dots, dashes, x's, or any other shape depending upon the configuration of the beams of light. In the example illustrated in FIG. 3, the projection artifacts 302 comprise dots.

As further illustrated in FIG. 3, the plurality of projection artifacts 302 is arranged into a grid pattern comprising a plurality of rows $304_1$-$304_i$ (hereinafter individually referred to as a "row 304" or collectively referred to as "rows 304") and a plurality of columns $306_1$-$306_j$ (hereinafter individually referred to as "a column 306" or collectively referred to as "columns 306"). In one example, the arrangement of the rows 304 is staggered. For instance, in the example illustrated, the rows 304 are arranged so that the projection artifacts 302 of every other row 304 are aligned or collinear along imaginary lines that pass through the centers of the projection artifacts 302 in the y or vertical direction. As an example, the projection artifacts 302 of the rows $304_1$ and $304_i$ are aligned in this manner. Conversely, in the example illustrated, the projection artifacts 302 of any two immediately adjacent rows 304 will not be aligned (e.g., there will not be an imaginary line in the y or vertical direction that passes through the centers of the projection artifacts 302 of both rows 304). As an example, the projection artifacts 302 of the rows $304_1$ and $304_2$ are arranged in this manner.

Similarly, the arrangement of the columns 306 is also staggered. For instance, in the example illustrated, the columns 306 are arranged so that the projection artifacts 302 of every other column 306 are aligned or collinear along imaginary lines that pass through the centers of the projection artifacts 302 in the x or horizontal direction. As an example, the projection artifacts 302 of the columns $306_1$ and $306_j$ are aligned in this manner. Conversely, in the example illustrated, the projection artifacts 302 of any two immediately adjacent columns 306 will not be aligned (e.g., there will not be an imaginary line in the x or horizontal direction that passes through the centers of the projection artifacts 302 of both columns 306). As an example, the projection artifacts 302 of the columns $306_1$ and $306_2$ are arranged in this manner.

Thus far, the example projection pattern 300 of FIG. 3 is similar to the example projection patterns 100 and 200 of FIGS. 1 and 2, respectively. However, unlike the projection patterns 100 and 200, in which the pass alignment is arranged to be three intervals and five intervals, respectively, in the horizontal or x direction, the example projection pattern 300 is arranged so that the pass alignment of the projection pattern 300 is seven intervals in the horizontal or x direction. As is the case in FIG. 1 and FIG. 2, an "interval" in the horizontal or x direction is understood within the context of the present disclosure to refer to the distance in the x or horizontal direction between a first imaginary line 308 that passes (in the y or vertical direction) through the centers of the projection artifacts 302 in a first column 306 (e.g., column $306_1$) and a second imaginary line 310 that passes (in the y or vertical direction) through the centers of the projection artifacts 302 in a second column 306 that is immediately adjacent to the first column 306 (e.g., column $306_2$).

The length of a single interval in the horizontal or x direction may be defined as "a." That is, a distance of a may exist in the horizontal or x direction between each pair of immediately adjacent columns 306 (or between the centers of the projection artifacts 302 in the pair of immediately adjacent columns 306).

Similarly, the distance in the x or horizontal direction from the first imaginary line 308 that passes (in the y or vertical direction) through the centers of the projection artifacts 302 in the first column 306 to a third imaginary line 312 that passes (in the y or vertical direction) through the centers of the projection artifacts 302 in a third column 306 that is two columns away from the first column 306 may be defined as "2a." The distance in the x or horizontal direction from the first imaginary line 308 that passes (in the y or vertical direction) through the centers of the projection artifacts 302 in the first column 306 to a fourth imaginary line 314 that passes (in the y or vertical direction) through the centers of the projection artifacts 302 in a fourth column 306 that is seven columns away from the first column 306 may be defined as "7a."

Furthermore, the example projection pattern 300 of FIG. 3 is arranged so that an "interval" in the vertical or y direction is understood within the context of the present disclosure to refer to the distance in the y or vertical direction between a first imaginary line 316 that passes (in the x or horizontal direction) through the centers of the projection artifacts 302 in a first row 304 (e.g., row $304_1$) and a second imaginary line 318 that passes (in the x or horizontal direction) through the centers of the projection artifacts 302 in a second row 304 that is immediately adjacent to the first row 304 (e.g., row $304_2$). A single interval in the vertical or y direction may be defined as "b." That is, a distance of b may exist in the vertical or y direction between each pair of immediately adjacent rows 304 (or between the centers of the projection artifacts 302 in the pair of immediately adjacent rows 304).

As discussed above, the example projection pattern 300 of FIG. 3 is arranged so that a "pass alignment" of the projection pattern 300 is seven intervals in the horizontal or x direction. In this case, the length, L, of the projection artifacts' trajectory (or moving range) may be approximately equal to the shortest distance between the center of a first projection artifact 302 in a first column 306 and the center of a second projection artifact 302 in the fourth column 306 that is seven columns away from the first column 306. Thus, in FIG. 3, L is approximately (though not exactly) equal to 7a.

Furthermore, an angle θ in the projection pattern 300 may be defined as the angle between an imaginary line 320 that passes in the x or horizontal direction between the center of a first projection point 302 in a first column 306 and an imaginary line 322 that passes through both the center of the first projection point 302 and the center of a second projection point 302 in a second column 306 that is seven columns away from the first column (where the second projection point 302 may be the closest projection point in the second column 306 to the first projection point 302). The first projection point 302 and the second projection point 302 may also reside in immediately adjacent rows 304. The angle θ may be defined according to EQN. 1, above. Moreover, the relation of EQN. 2 also holds for the example projection pattern 300 of FIG. 3.

However, for the seven-interval pass alignment of FIG. 3, the interval b in the vertical or y direction may be defined according to:

$$b = \tan(\theta) \times 7a \approx 7d. \quad \text{(EQN. 13)}$$

Therefore, $$\frac{b}{a} = 7 \times (d/a) \quad \text{(EQN. 14)}$$

Thus, k may be defined as:

$$k = \frac{L}{d} = 7 \times \frac{a}{d} \quad \text{(EQN. 15)}$$

when a=b (or a/b=1). As such, $$7 \times 7\left(\frac{d}{a}\right) = 1 \quad \text{(EQN. 16)}$$

and $$k = 7 \times \frac{a}{d} = 49. \quad \text{(EQN. 17)}$$

In one example, the seven-interval pass alignment arrangement of the distance pattern 300 illustrated in FIG. 3 may be implemented when k is greater than the second predefined threshold. In one example, the second predefined threshold is thirty-five, such that k>35.

Thus, it should be noted that EQNs. 7, 12, and 17 can be generalized to define k as:

$$k = N \times \frac{a}{d} = N^2, \quad \text{(EQN. 18)}$$

when a=b, where N is the number of intervals in the pass alignment of the projection pattern (e.g., three, five, seven, or another number). In one example, for a projection pattern in which the rows and columns are staggered with respect to each other, N may be any odd number. FIGS. 4A-4C and 5A-5C, discussed in further detail below, illustrate examples in which a≠b. In this case, EQN. 18 may not hold.

Figure 4C:
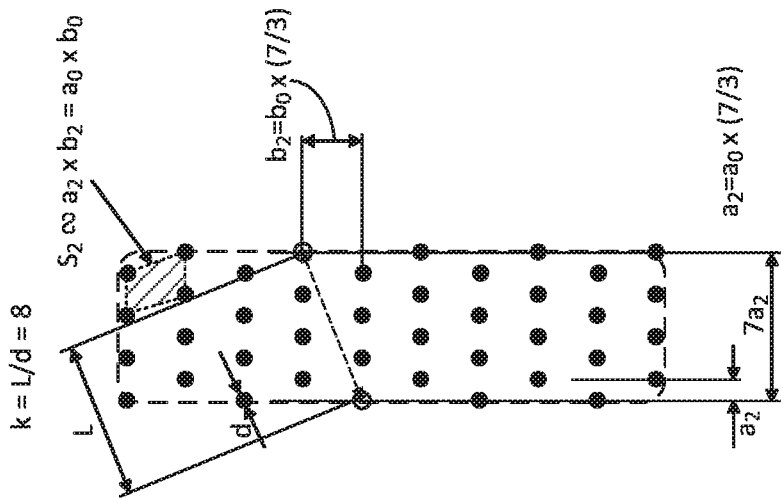
FIGS. 4A-4C illustrate examples of different projection patterns in which the diameter d of the projection artifacts is the same, but the interval passing length, or number of intervals in the pass alignment, varies.
Figure 4B:
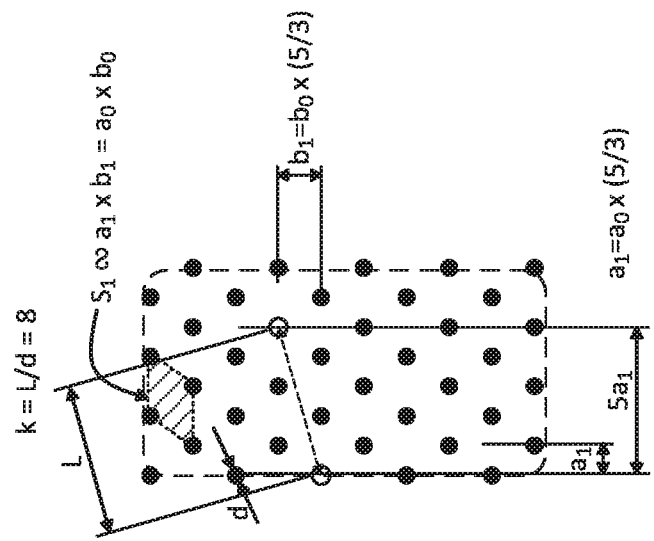
Figure 4A:
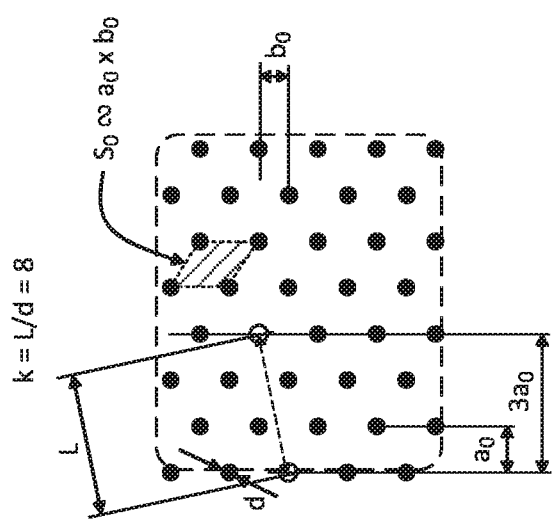

FIGS. 4A-4C illustrate examples of different projection patterns in which the diameter d of the projection artifacts is the same, but the interval passing length, or number of intervals in the pass alignment, varies. More specifically, FIG. 4A illustrates an example of a three-interval pass alignment; FIG. 4B illustrates an example of a five-interval pass alignment; and FIG. 4C illustrates an example of a seven-interval pass alignment.

In the example of 4A, the interval in the x or horizontal direction is defined as $a_0$. Thus, the distance in the x or horizontal direction from an imaginary line that passes (in the y or vertical direction) through the centers of the projection artifacts in a first column to an imaginary line that passes (in the y or vertical direction) through the centers of the projection artifacts in a second column that is three columns away from the first column may be defined as "$3a_0$." Moreover, L is approximately (but not exactly) equal to $3a_0$.

Additionally, the interval in the y or vertical direction is defined as $b_0$. Thus, the pattern area, $S_0$, of the projection pattern, which may be defined as the area bounded by a single interval in the horizontal direction and a single interval in the vertical direction (which has a parallelogram shape, as illustrated), is approximately $a_0 \times b_0$.

In FIG. 4A, the pattern density parameter k is set to an example value of eight; thus, k=L/d=8.

In the example of 4B, the interval in the x or horizontal direction is defined as $a_1$, where $a_1 < a_0$. In one example, $a_1 = a_0 \times (3/5)$, where 3 is the size of the passing interval associated with the horizontal interval of size $a_0$, and 5 is the size of the passing interval associated with the horizontal interval of size $a_1$.

Thus, the distance in the x or horizontal direction from an imaginary line that passes (in the y or vertical direction) through the centers of the projection artifacts in a first column to an imaginary line that passes (in the y or vertical direction) through the centers of the projection artifacts in a second column that is five columns away from the first column may be defined as "$5a_1$." Moreover, L is approximately (but not exactly) equal to $5a_1$. Thus, $5a_1$ is also approximately equal to $3a_0$.

Additionally, the interval in the y or vertical direction is defined as $b_1$, where $b_1 > b_0$. In one example, $b_1 = b_0 \times (5/3)$, where 5 is the size of the passing interval associated with the vertical interval of size $b_1$, and 3 is the size of the passing interval associated with the vertical interval of size $b_0$. Thus, the pattern area of the projection pattern is approximately $a_1 \times b_1$, which in turn is equal to $a_0 \times b_0$.

Thus, even though the sizes of the intervals in the horizontal and vertical directions are changed relative to the three-interval pass alignment (i.e., $a_0 > a_1$ and $b_0 < b_1$), the following parameters remain constant: the pattern area of the projection pattern (i.e., $S_0 = S_1$), the length, L, of the projection artifacts' trajectory, and the diameter, d, of the projection artifacts. Therefore, since the pattern density parameter k=L/d, the value of k remains unchanged (i.e., k=8).

In the example of 4C, the interval in the x or horizontal direction is defined as $a_2$, where $a_2 < a_1 < a_0$. In one example, $a_2 = a_0 \times (3/7)$, where 3 is the size of the passing interval associated with the horizontal interval of size $a_0$, and 7 is the size of the passing interval associated with the horizontal interval of size $a_2$.

Thus, the distance in the x or horizontal direction from an imaginary line that passes (in the y or vertical direction) through the centers of the projection artifacts in a first column to an imaginary line that passes (in the y or vertical direction) through the centers of the projection artifacts in a second column that is seven columns away from the first column may be defined as "$7a_2$." Moreover, L is approximately (but not exactly) equal to $7a_2$. Thus, $7a_2$ is also approximately equal to $5a_1$ and $3a_0$.

Additionally, the interval in the y or vertical direction is defined as $b_2$, where $b_2 > b_1 > b_0$. In one example, $b_2 = b_0 \times (7/3)$, where 7 is the size of the passing interval associated with the vertical interval of size $b_2$, and 3 is the size of the passing interval associated with the vertical interval of size $b_0$. Thus, the pattern area, $S_2$, of the projection pattern is approximately $a_2 \times b_2$, which in turn is equal to $a_1 \times b_1$ and $a_0 \times b_0$.

Thus, even though the sizes of the intervals in the horizontal and vertical directions are changed relative to the three-interval and five-interval pass alignments (i.e., $a_0 > a_1 > a_2$ and $b_0 < b_1 < b_2$), the following parameters remain constant: the pattern area of the projection pattern (i.e., $S_0 = S_1 = S_2$), the length, L, of the projection artifacts' trajectory, and the diameter, d, of the projection artifacts. Therefore, since the pattern density parameter $k = L/d$, the value of k remains unchanged (i.e., $k=8$).

As such, it can be seen that the interval passing length can be varied without changing the diameter of the projection artifacts or the parameter k, simply by adjusting the sizes of the intervals in the horizontal and vertical directions appropriately. Put another way, the pattern density can be maintained even when the trajectory path conditions are changed.

Figures 5A, 5B, 5C:
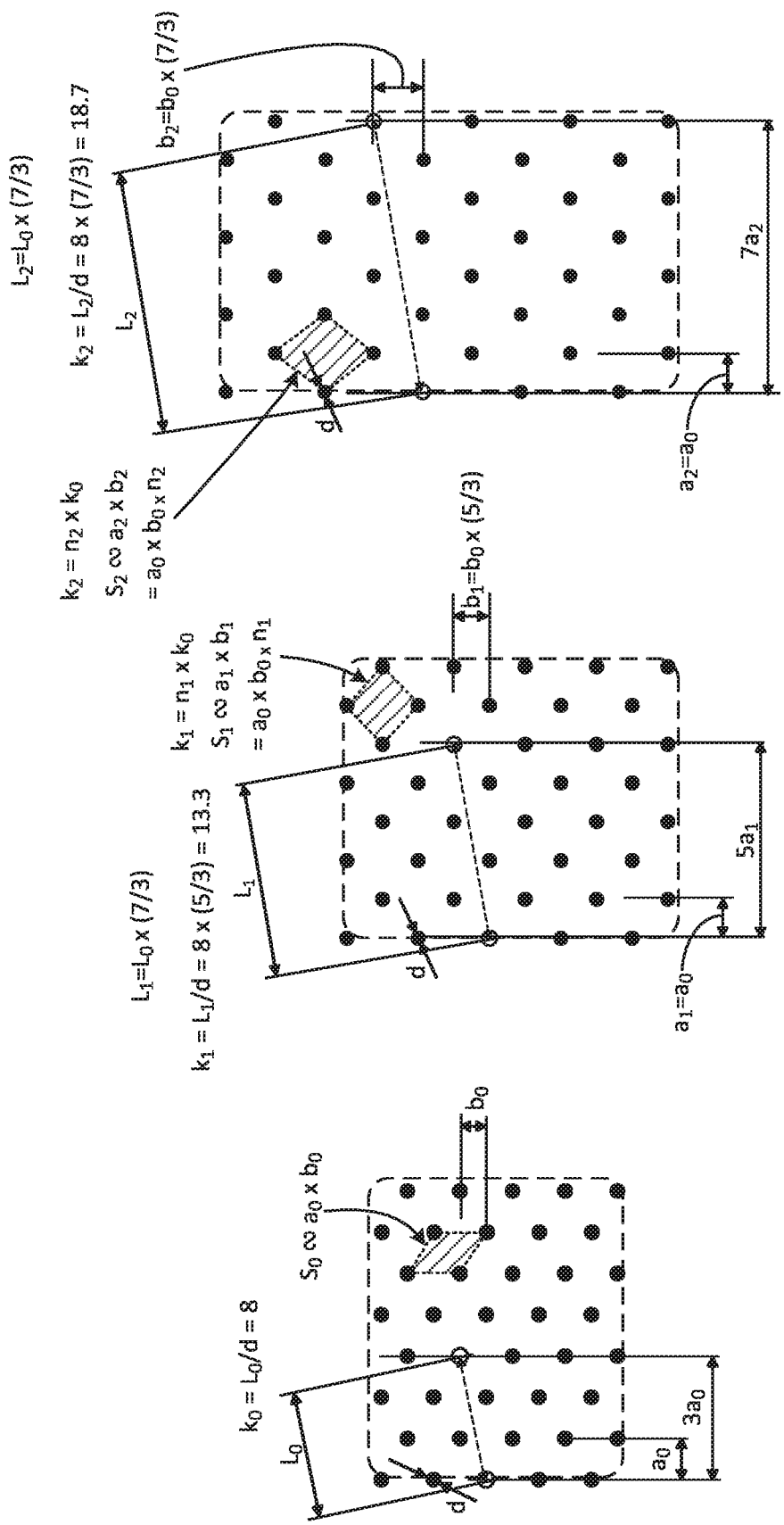
FIGS. 5A-5C illustrate examples of different projection patterns in which the diameter d of the projection artifacts is the same, but the pattern density parameter and interval passing length, or number of intervals in the pass alignment, vary.

FIGS. 5A-5C illustrate examples of different projection patterns in which the diameter d of the projection artifacts is the same, but the pattern density parameter and interval passing length, or number of intervals in the pass alignment, vary. More specifically, FIG. 5A illustrates an example of a three-interval pass alignment; FIG. 5B illustrates an example of a five-interval pass alignment; and FIG. 5C illustrates an example of a seven-interval pass alignment.

In the example of 5A, the interval in the x or horizontal direction is defined as $a_0$. Thus, the distance in the x or horizontal direction from an imaginary line that passes (in the y or vertical direction) through the centers of the projection artifacts in a first column to an imaginary line that passes (in the y or vertical direction) through the centers of the projection artifacts in a second column that is three columns away from the first column may be defined as "$3a_0$." Moreover, the length, $L_0$, of the projection artifacts' trajectory (or moving range) is approximately (but not exactly) equal to $3a_0$.

Additionally, the interval in the y or vertical direction is defined as $b_0$. Thus, the pattern area, $S_0$, of the projection pattern is approximately $a_0 \times b_0$.

In FIG. 5A, the pattern density parameter $k_0$ is set to an example value of eight; thus, $k_0 = L_0/d = 8$.

In the example of 5B, the interval in the x or horizontal direction remains constant relative to the three-interval passing length illustrated in FIG. 5A, i.e., $a_1 = a_0$. Thus, the distance in the x or horizontal direction from an imaginary line that passes (in the y or vertical direction) through the centers of the projection artifacts in a first column to an imaginary line that passes (in the y or vertical direction) through the centers of the projection artifacts in a second column that is five columns away from the first column may be defined as "$5a_1$." Thus, $5a_1$ is greater than $3a_0$.

Moreover, the length, $L_1$, of the projection artifacts' trajectory (or moving range) in FIG. 5B is approximately (but not exactly) equal to $5a_1$, which also makes $L_1$ greater than $L_0$. In one example, $L_1 = L_0 \times (5/3)$, where 5 is the size of the passing interval associated with the trajectory length $L_1$, and 3 is the size of the passing interval associated with the trajectory length size $L_0$.

Additionally, the interval in the y or vertical direction is defined as $b_1$, where $b_1 > b_0$. In one example, $b_1 = b_0 \times (5/3)$, where 5 is the size of the passing interval associated with the vertical interval of size $b_1$, and 3 is the size of the passing interval associated with the vertical interval of size $b_0$. Thus, the pattern area, $S_1$, of the projection pattern is approximately $a_1 \times b_1$, which in turn is equal to $a_0 \times b_0 \times n_1$. In this case, $n_1$ represents a multiplier (e.g., a number of times) by which the pattern density parameter $k_0$ of FIG. 5A is increased to arrive at a pattern density parameter $k_1$ for FIG. 5B. In other words, $k_1 = k_0 \times n_1$ in FIG. 5B. In the example of FIG. 5B, $n_1 = 5/3$.

Thus, although the size of the intervals in the horizontal direction and the diameter of the projection artifacts remain constant relative to the three-interval pass alignment (i.e., $a_0 = a_1$ and $d = d$), the following parameters are increased in order to increase the pattern density parameter the pattern area of the projection pattern (i.e., $S_0 > S_1$), the length of the projection artifacts' trajectory (i.e., $L_1 > L_0$), and the size of the intervals in the vertical direction (i.e., $b_1 > b_0$). Therefore, since the pattern density parameter $k_1 = L_1/d$, the value of $k_1$ is increased relative to $k_0$. In one example, $k_1 = L_1/d = 8 \times (5/3) = 13.3$ (as compared to $k_0 = 8$).

In the example of 5C, the interval in the x or horizontal direction remains constant relative to the three-interval passing length and five-interval passing length illustrated in FIGS. 5A and 5B, respectively, i.e., $a_2 = a_1 = a_0$. Thus, the distance in the x or horizontal direction from an imaginary line that passes (in the y or vertical direction) through the centers of the projection artifacts in a first column to an imaginary line that passes (in the y or vertical direction) through the centers of the projection artifacts in a second column that is seven columns away from the first column may be defined as "$7a_2$." Thus, $7a_2 > 5a_1 > 3a_0$.

Moreover, the length, $L_2$, of the projection artifacts' trajectory (or moving range) in FIG. 5C is approximately (but not exactly) equal to $7a_2$, which also makes $L_2 > L_1 > L_0$. In one example, $L_2 = L_0 \times (7/3)$, where 7 is the size of the passing interval associated with the trajectory length $L_2$, and 3 is the size of the passing interval associated with the trajectory length size $L_0$.

Additionally, the interval in the y or vertical direction is defined as $b_2$, where $b_2 > b_1 > b_0$. In one example, $b_2 = b_0 \times (7/3)$, where 7 is the size of the passing interval associated with the vertical interval of size $b_2$, and 3 is the size of the passing interval associated with the vertical interval of size $b_0$. Thus, the pattern area, $S_2$, of the projection pattern is approximately $a_2 \times b_2$, which in turn is equal to $a_0 \times b_0 \times n_2$. In this case, $n_2$ represents a multiplier (e.g., a number of times) by which the pattern density parameter $k_0$ of FIG. 5A is increased to arrive at a pattern density parameter $k_2$ for FIG. 5C. In other words, $k_2 = k_0 \times n_2$ in FIG. 5C. In the example of FIG. 5C, $n_2 = 7/3$.

Thus, although the size of the intervals in the horizontal direction and the diameter of the projection artifacts remain constant relative to the three-interval pass alignment (i.e., $a_0 = a_2$ and $d = d$), the following parameters are increased in order to increase the pattern density parameter $k_2$: the pattern area of the projection pattern (i.e., $S_0 > S_2$), the length of the projection artifacts' trajectory (i.e., $L_2 > L_0$), and the size of the intervals in the vertical direction (i.e., $b_2 > b_0$). Therefore, since the pattern density parameter $k_2 = L_2/d$, the value of $k_2$ is increased relative to $k_0$. In one example, $k_2 = L_2/d = 8 \times (7/3) = 18.7$ (as compared to $k_0 = 8$).

As such, it can be seen that the pattern density can be decreased without changing the diameter of the projection artifacts, simply by adjusting the length of the projection artifacts' trajectories and the size of the intervals in the vertical direction appropriately. Put another way, the pattern density parameter k can be increased by n times, even when the projection artifact size is kept constant, by increasing the pattern area by n times.

Figure 6:
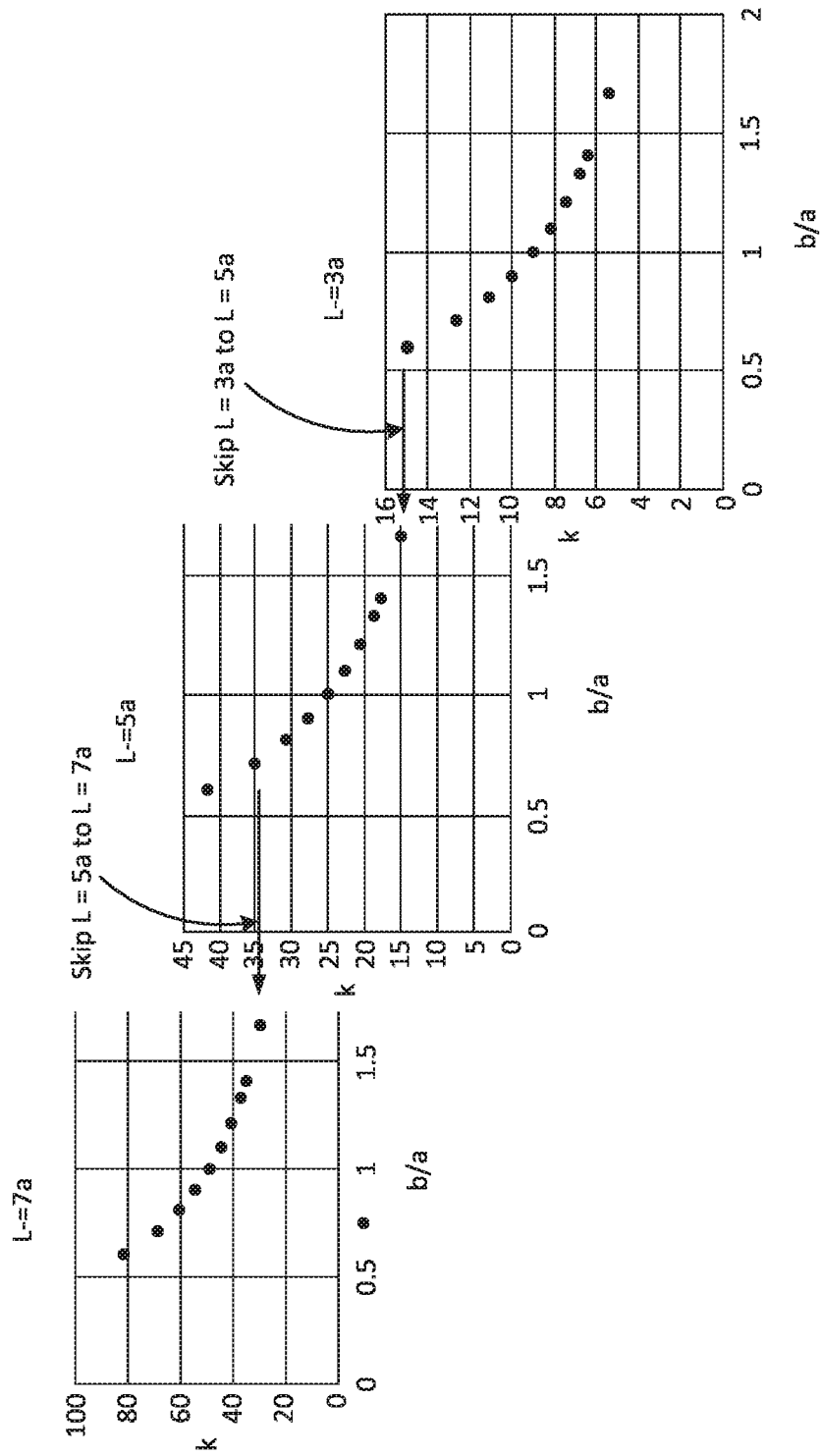
FIG. 6 presents a plurality of charts illustrating the relationship between the pattern density parameter k and interval size ratio b/a for a plurality of different projection artifact trajectory lengths.

FIG. 6 presents a plurality of charts illustrating the relationship between the pattern density parameter k and interval size ratio b/a (i.e., the ratio of the size of the interval in the vertical direction to the size of the ratio in the horizontal direction) for a plurality of different projection artifact trajectory lengths L (i.e., L of 3a, 5a, and 7a in the example illustrated). In one example, as the value of k increases, it may be desirable to also increase L. For instance, the illustrated example shows a case in which the trajectory length L is 3a (e.g., three-interval pass alignment) when k<15. However, for 15<k<35, the trajectory length L is 5a (e.g., five-interval pass alignment). Moreover, for k>35, the trajectory length L is 7a (e.g., seven-interval pass alignment).

Figure 7:
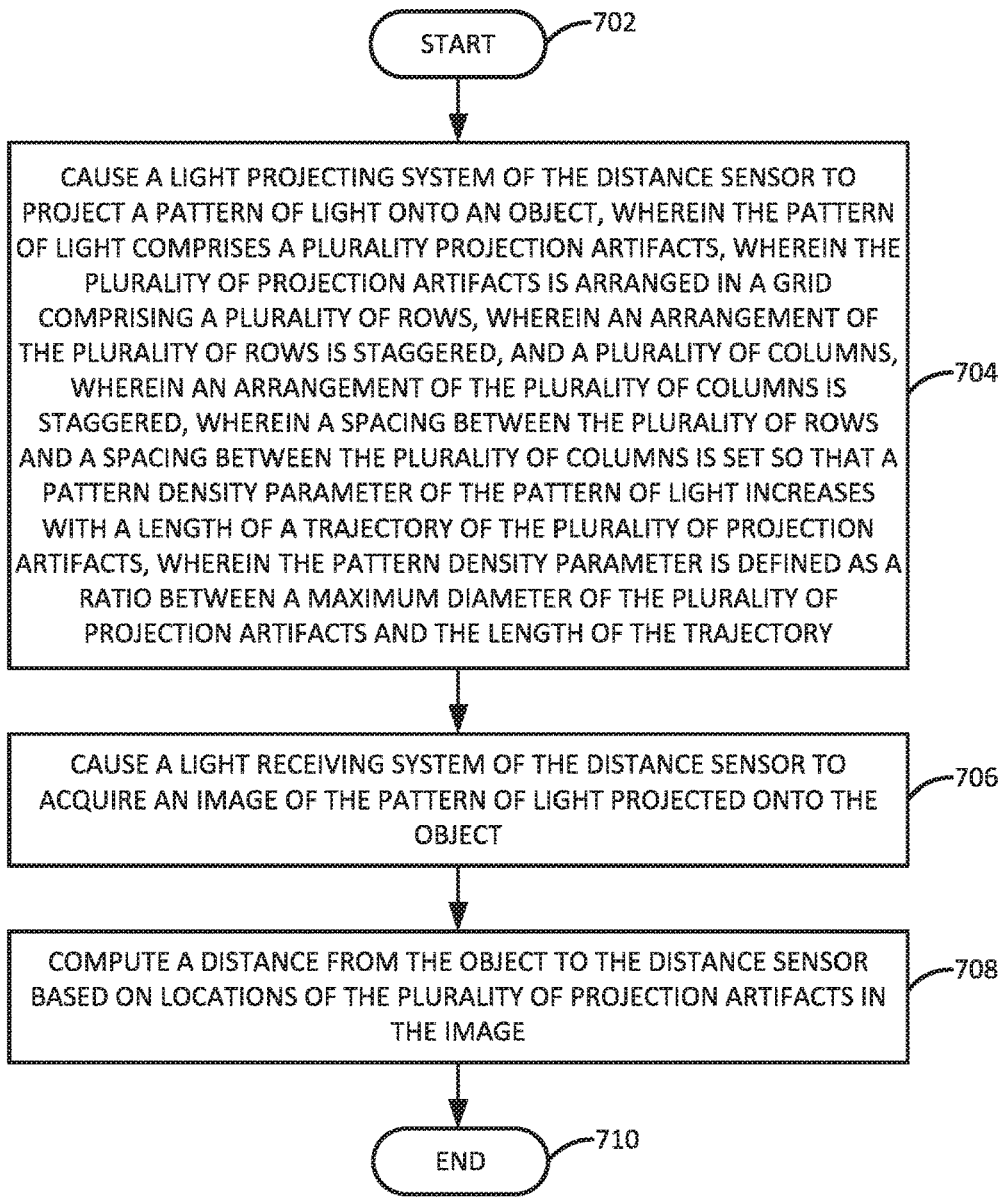
FIG. 7 is a flow diagram illustrating an example method for calculating the distance to an object, according to examples of the present disclosure.

FIG. 7 is a flow diagram illustrating an example method 700 for calculating the distance to an object, according to examples of the present disclosure. The method 700 may be performed, for example, by a processor, such as the processor of a distance sensor or the processor 802 illustrated in FIG. 8. For the sake of example, the method 700 is described as being performed by a processing system.

The method 700 may begin in step 702. In step 704, the processing system may cause a light projecting system of a distance sensor to project a pattern of light onto an object. For instance, the processing system may send an electronic signal to the light projecting system, where the electronic signal encodes an instruction. As discussed above, the light may be of a wavelength that is substantially invisible to the human eye, but that is detectable by an imaging sensor of the distance sensor (e.g., infrared light).

The pattern of light may be created by a plurality of beams projected by the distance sensor's light projecting system. The plurality of beams may project a plurality of projection artifacts onto the object, where the projection artifacts collectively form the pattern of light, or a "projection pattern." In one example, the projection artifacts may be arranged into a grid pattern comprising a plurality of rows and a plurality of columns, where the arrangement of rows and columns is staggered. For instance the rows may be arranged so that the projection artifacts of every other row are aligned or collinear along imaginary lines that pass through the centers of the projection artifacts in the y or vertical direction. Conversely the projection artifacts in any two immediately adjacent rows will not be aligned (e.g., there will not be an imaginary line in they or vertical direction that passes through the centers of the projection artifacts of both rows 1).

Similarly, the columns may be arranged so that the projection artifacts of every other column are aligned or collinear along imaginary lines that pass through the centers of the projection artifacts in the x or horizontal direction. Conversely the projection artifacts of any two immediately adjacent columns will not be aligned (e.g., there will not be an imaginary line in the x or horizontal direction that passes through the centers of the projection artifacts of both columns).

Moreover, the spacing between the rows and the spacing between the columns may be set so that a pattern density parameter (e.g., a metric indicating a spacing between projection artifacts) increases with a length of a trajectory (e.g., moving range) of the projection artifacts. The pattern density parameter may be defined as the ratio between the maximum diameter (or width, where the projection artifacts are not circular) of the projection artifacts on an image sensor of the distance sensor's light receiving system to the trajectory length.

In step 706, the processing system may cause a light receiving system of the distance sensor to acquire an image of the projection pattern on the object. For instance, the processing system may send an electronic signal to the light receiving system, where the electronic signal encodes an instruction. As discussed above, although the projection pattern (e.g., the light forming the projection pattern) may be invisible to the human eye, it may be visible to an image sensor of the light receiving system.

In step 708, the processing system may compute the distance from the object to the distance sensor, in accordance with the locations of a plurality of projection artifacts that are visible (to the image sensor) in the image acquired in step 706. The distance may be computed in any of the manners discussed in U.S. patent application Ser. Nos. 14/920,246, 15/149,323, and 15/149,429 (e.g., using triangulation techniques).

The method 700 may end in step 710.

It should be noted that although not explicitly specified, some of the blocks, functions, or operations of the method 700 described above may include storing, displaying and/or outputting for a particular application. In other words, any data, records, fields, and/or intermediate results discussed in the method 700 can be stored, displayed, and/or outputted to another device depending on the particular application. Furthermore, blocks, functions, or operations in FIG. 7 that recite a determining operation, or involve a decision, do not imply that both branches of the determining operation are practiced. In other words, one of the branches of the determining operation may not be performed, depending on the results of the determining operation.

Figure 8:
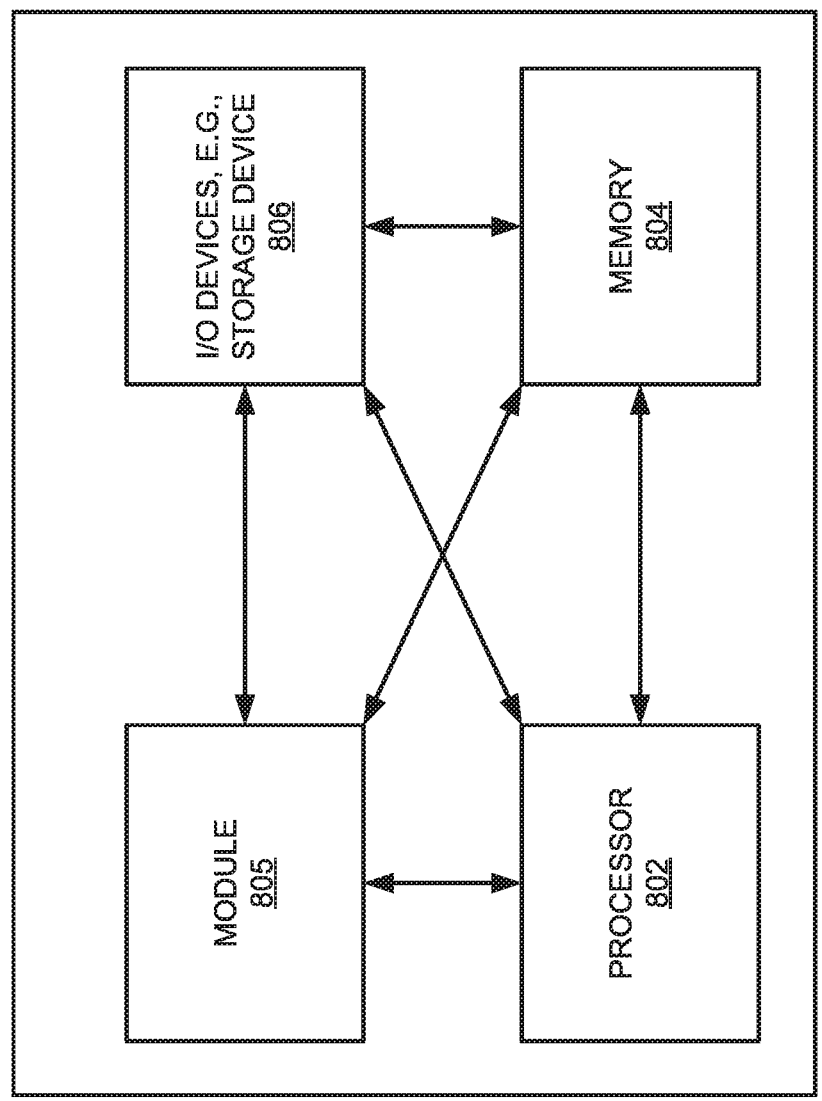
FIG. 8 depicts a high-level block diagram of an example electronic device for calculating the distance from a sensor to an object.

FIG. 8 depicts a high-level block diagram of an example electronic device 800 for calculating the distance from a sensor to an object. As such, the electronic device 800 may be implemented as a processor of an electronic device or system, such as a distance sensor.

As depicted in FIG. 8, the electronic device 800 comprises a hardware processor element 802, e.g., a central processing unit (CPU), a microprocessor, or a multi-core processor, a memory 804, e.g., random access memory (RAM) and/or read only memory (ROM), a module 805 for calculating the distance from a sensor to an object, and various input/output devices 806, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, a camera, a laser light source, an LED light source, and the like.

Although one processor element is shown, it should be noted that the electronic device 800 may employ a plurality of processor elements. Furthermore, although one electronic device 800 is shown in the figure, if the method(s) as discussed above is implemented in a distributed or parallel manner for a particular illustrative example, i.e., the blocks of the above method(s) or the entire method(s) are implemented across multiple or parallel electronic devices, then the electronic device 800 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 805 for calculating the distance from a sensor to an object, e.g., machine readable instructions can be loaded into memory 804 and executed by hardware processor element 802 to implement the blocks, functions or operations as discussed above in connection with the method 700. Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 805 for calculating the distance from a sensor to an object of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a safety sensor system.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A method, comprising:
    causing, by a processing system of a distance sensor, a light projecting system of the distance sensor to project a pattern of light onto an object, wherein the pattern of light comprises a plurality projection artifacts, wherein the plurality of projection artifacts is arranged in a grid comprising:
        a plurality of rows, wherein an arrangement of the plurality of rows is staggered; and
        a plurality of columns, wherein an arrangement of the plurality of columns is staggered,
        wherein a spacing between the plurality of rows and a spacing between the plurality of columns is set so that a pattern density parameter of the pattern of light increases with a length of a trajectory of the plurality of projection artifacts, wherein the pattern density parameter is defined as a ratio between a maximum diameter of the plurality of projection artifacts and the length of the trajectory;
    causing, by the processing system, a light receiving system of the distance sensor to acquire an image of the pattern of light projected onto the object; and
    computing, by the processing system, a distance from the object to the distance sensor based on locations of the plurality of projection artifacts in the image.

2. The method of claim 1, wherein the plurality of rows is arranged so that a subset of the plurality of projection artifacts residing in two adjacent rows of the plurality of rows are not aligned along an imaginary line that passes in the vertical direction.

3. The method of claim 1, wherein the plurality of columns is arranged so that a subset of the plurality of projection artifacts residing in two adjacent columns of the plurality of columns are not aligned along an imaginary line that passes in the horizontal direction.

4. The method of claim 1, wherein the length of the trajectory is equal to a shortest distance between a center of a first projection artifact of the plurality of projection artifacts residing in a first column of the plurality of columns and a center of a second projection artifact of the plurality of projection artifacts residing in a second column of the plurality of columns, wherein the second column is three columns away from the first column.

5. The method of claim 4, wherein a value of the pattern density parameter is less than fifteen.

6. The method of claim 1, wherein the length of the trajectory is equal to a shortest distance between a center of a first projection artifact of the plurality of projection artifacts residing in a first column of the plurality of columns and a center of a second projection artifact of the plurality of projection artifacts residing in a second column of the plurality of columns, wherein the second column is five columns away from the first column.

7. The method of claim 6, wherein a value of the pattern density parameter is greater than fifteen and less than thirty-five.

8. The method of claim 1, wherein the length of the trajectory is equal to a shortest distance between a center of a first projection artifact of the plurality of projection artifacts residing in a first column of the plurality of columns and a center of a second projection artifact of the plurality of projection artifacts residing in a second column of the plurality of columns, wherein the second column is seven columns away from the first column.

9. The method of claim 8, wherein a value of the pattern density parameter is greater than thirty-five.

10. The method of claim 1, wherein a magnitude of a value of the pattern density parameter is inversely proportional to a density of the pattern of light.

11. The method of claim 1, wherein each pair of rows of the plurality of rows is spaced apart from each other by a first interval in the vertical direction, and each pair of columns of the plurality of columns is spaced apart from each other by a second interval in the horizontal direction.

12. The method of claim 11, wherein the first interval is equal to the second interval.

13. The method of claim 11, wherein the first interval is not equal to the second interval.

14. The method of claim 11, wherein the pattern density parameter is variable by varying at least one of the first interval and the second interval.

15. A non-transitory machine-readable storage medium encoded with instructions executable by a processing system of a distance sensor, wherein, when executed, the instructions cause the processing system to perform operations, the operations comprising:
    causing a light projecting system of the distance sensor to project a pattern of light onto an object, wherein the pattern of light comprises a plurality projection artifacts, wherein the plurality of projection artifacts is arranged in a grid comprising:
        a plurality of rows, wherein an arrangement of the plurality of rows is staggered; and a plurality of columns, wherein an arrangement of the plurality of columns is staggered, wherein a spacing between the plurality of rows and a spacing between the plurality of columns is set so that a pattern density parameter of the pattern of light increases with a length of a trajectory of the plurality of projection artifacts, wherein the pattern density parameter is defined as a ratio between a maximum diameter of the plurality of projection artifacts and the length of the trajectory;

causing a light receiving system of the distance sensor to acquire an image of the pattern of light projected onto the object; and computing a distance from the object to the distance sensor based on locations of the plurality of projection artifacts in the image.

16. The non-transitory machine-readable storage medium of claim 15, wherein the length of the trajectory is equal to a shortest distance between a center of a first projection artifact of the plurality of projection artifacts residing in a first column of the plurality of columns and a center of a second projection artifact of the plurality of projection artifacts residing in a second column of the plurality of columns, wherein the second column is three columns away from the first column, and wherein a value of the pattern density parameter is less than fifteen.

17. The non-transitory machine-readable storage medium of claim 15, wherein the length of the trajectory is equal to a shortest distance between a center of a first projection artifact of the plurality of projection artifacts residing in a first column of the plurality of columns and a center of a second projection artifact of the plurality of projection artifacts residing in a second column of the plurality of columns, wherein the second column is five columns away from the first column, and wherein a value of the pattern density parameter is greater than fifteen and less than thirty-five.

18. The non-transitory machine-readable storage medium of claim 15, wherein the length of the trajectory is equal to a shortest distance between a center of a first projection artifact of the plurality of projection artifacts residing in a first column of the plurality of columns and a center of a second projection artifact of the plurality of projection artifacts residing in a second column of the plurality of columns, wherein the second column is seven columns away from the first column, and wherein a value of the pattern density parameter is greater than thirty-five.

19. The non-transitory machine-readable storage medium of claim 15, wherein each pair of rows of the plurality of rows is spaced apart from each other by a first interval in the vertical direction, and each pair of columns of the plurality of columns is spaced apart from each other by a second interval in the horizontal direction, and wherein the pattern density parameter is variable by varying at least one of the first interval and the second interval.

20. An apparatus, comprising:

a processing system; and a non-transitory machine-readable storage medium encoded with instructions executable by the processing system, wherein, when executed, the instructions cause the processing system to perform operations, the operations comprising:

causing a light projecting system of a distance sensor to project a pattern of light onto an object, wherein the pattern of light comprises a plurality projection artifacts, wherein the plurality of projection artifacts is arranged in a grid comprising:

a plurality of rows, wherein an arrangement of the plurality of rows is staggered; and a plurality of columns, wherein an arrangement of the plurality of columns is staggered, wherein a spacing between the plurality of rows and a spacing between the plurality of columns is set so that a pattern density parameter of the pattern of light increases with a length of a trajectory of the plurality of projection artifacts, wherein the pattern density parameter is defined as a ratio between a maximum diameter of the plurality of projection artifacts and the length of the trajectory;

causing a light receiving system of the distance sensor to acquire an image of the pattern of light projected onto the object; and computing a distance from the object to the distance sensor based on locations of the plurality of projection artifacts in the image.

\* \* \* \* \*